(12) United States Patent
Weldon

(10) Patent No.: US 7,606,011 B2
(45) Date of Patent: Oct. 20, 2009

(54) MOTOR CONTROLLER WITH AUTOMATED INPUT POWER DETERMINATION

(75) Inventor: James Weldon, Libertyville, IL (US)

(73) Assignee: Sundyne Corporation, Arvada, CO (US)

( * ) Notice: Subject to any disclaimer, the term of this patent is extended or adjusted under 35 U.S.C. 154(b) by 781 days.

(21) Appl. No.: 10/825,059

(22) Filed: Apr. 15, 2004

(65) Prior Publication Data

US 2005/0231860 A1    Oct. 20, 2005

(51) Int. Cl.
*H02H 5/04* (2006.01)
*H02H 7/08* (2006.01)
*H02P 1/24* (2006.01)

(52) U.S. Cl. ............................. 361/23; 361/30; 318/729
(58) Field of Classification Search ........................ None
See application file for complete search history.

(56) References Cited

U.S. PATENT DOCUMENTS

| | | | |
|---|---|---|---|
| 4,052,648 A | 10/1977 | Nola | |
| 4,249,120 A | 2/1981 | Earle | |
| 4,255,694 A | 3/1981 | Morris et al. | |
| 4,454,462 A | 6/1984 | Spann | |
| 4,477,761 A | 10/1984 | Wolf | |
| 4,839,819 A | 6/1989 | Begin et al. | |
| 4,864,287 A | 9/1989 | Kierstead | |
| 4,979,122 A | 12/1990 | Davis et al. | |
| 4,982,147 A | 1/1991 | Lauw | |
| 4,989,155 A | 1/1991 | Begin et al. | |
| 5,204,606 A | 4/1993 | Kuwahara et al. | |
| 5,206,572 A | 4/1993 | Farag et al. | |
| 5,241,256 A | 8/1993 | Hatanaka et al. | |
| 5,248,967 A | 9/1993 | Daneshfar | |
| 5,251,157 A | 10/1993 | Prather | |
| 5,325,315 A | 6/1994 | Engel et al. | |
| 5,337,206 A | 8/1994 | Kadah et al. | |
| 5,650,936 A | 7/1997 | Loucks et al. | |
| 5,684,377 A | 11/1997 | Kim et al. | |
| 5,689,194 A | 11/1997 | Richards, II et al. | |
| 5,754,036 A | 5/1998 | Walker | |
| 5,828,576 A | 10/1998 | Loucks et al. | |
| 5,930,092 A | 7/1999 | Nystrom | |
| 6,128,583 A | 10/2000 | Dowling | |
| 6,208,109 B1 | 3/2001 | Yamai et al. | |
| 6,236,947 B1 | 5/2001 | Dowling et al. | |
| 6,262,550 B1 | 7/2001 | Kliman et al. | |
| 6,308,140 B1 | 10/2001 | Dowling et al. | |
| 6,445,966 B1 * | 9/2002 | Younger et al. | ............... 700/83 |
| 6,501,629 B1 | 12/2002 | Marriott | |
| 6,528,957 B1 | 3/2003 | Luchaco | |
| 6,529,135 B1 | 3/2003 | Bowers et al. | |
| 6,545,852 B1 | 4/2003 | Arnold | |
| 6,636,011 B2 | 10/2003 | Sadasivam et al. | |
| 6,690,137 B2 | 2/2004 | Iwaji et al. | |
| 2004/0090195 A1 * | 5/2004 | Motsenbocker | ............. 318/109 |

\* cited by examiner

*Primary Examiner*—Rexford N Barnie
*Assistant Examiner*—Dharti Patel
(74) *Attorney, Agent, or Firm*—Carlson, Gaskey & Olds PC

(57) ABSTRACT

A motor controller automatically determines a motor input power setting based upon manually entered motor output values. The motor controller includes an interface and an input power determining module that determines the motor input power setting from the entered motor output values. A display portion provides a visual display of the determined motor input power setting to facilitate using the determined setting to control motor operation.

23 Claims, 7 Drawing Sheets

MOTOR CONTROLLER WITH AUTOMATED INPUT POWER DETERMINATION

FIELD OF THE INVENTION

This invention relates to a machine assembly and, more particularly, to a motor controller in the assembly for automatically determining a motor input power.

DESCRIPTION OF THE RELATED ART

Electric motors are utilized for a variety of industrial applications. In one example, an assembly includes a motor that drives an industrial pump. The installation and control of the motor and pump requires a user to manually determine appropriate control settings from the motor characteristics to avoid operating conditions that could adversely affect the pump or motor. The user manually determines the settings including an appropriate motor input power setting from the motor rating, motor efficiency, and external current transformer values.

In conventional assemblies, a motor controller is in direct electrical communication with a motor and detects motor performance characteristics. Known motor controllers detect actual input power, for example. The motor controller is programmed to control the motor performance as known.

Known monitors measure and display the actual motor input power during motor operation. An individual user manually determines the appropriate motor input power setting. The user also independently determines input motor power trip values.

It is desirable to provide a motor controller that automatically determines motor input power setting information based upon motor output values. This invention addresses that need.

SUMMARY OF THE INVENTION

An exemplary embodiment of this invention is a motor controller that automatically determines a motor input power setting based on motor output values. In one example, the motor controller includes an interface for manually entering the output values and an input power determining module that determines the motor input power setting based on the entered output values. A display portion provides a visual display of the determined motor input power setting.

The motor controller is useful with a motor that drives a device. In one example, the device is an industrial pump.

In another example, the motor controller determines motor input trip values. A trip module either interrupts the motor input power or shuts off the motor when the trip values are exceeded, for example.

In another example, the motor controller selectively locks and prevents a user from entering information. One example locking module comprises software. In another example, the motor controller includes a hardware lock that prevents information from being entered when a user arranges a particular circuit configuration.

The various features and advantages of this invention will become apparent to those skilled in the art from the following detailed description of the currently preferred embodiment. The drawings that accompany the detailed description can be briefly described as follows.

DETAILED DESCRIPTION

Figure 1:
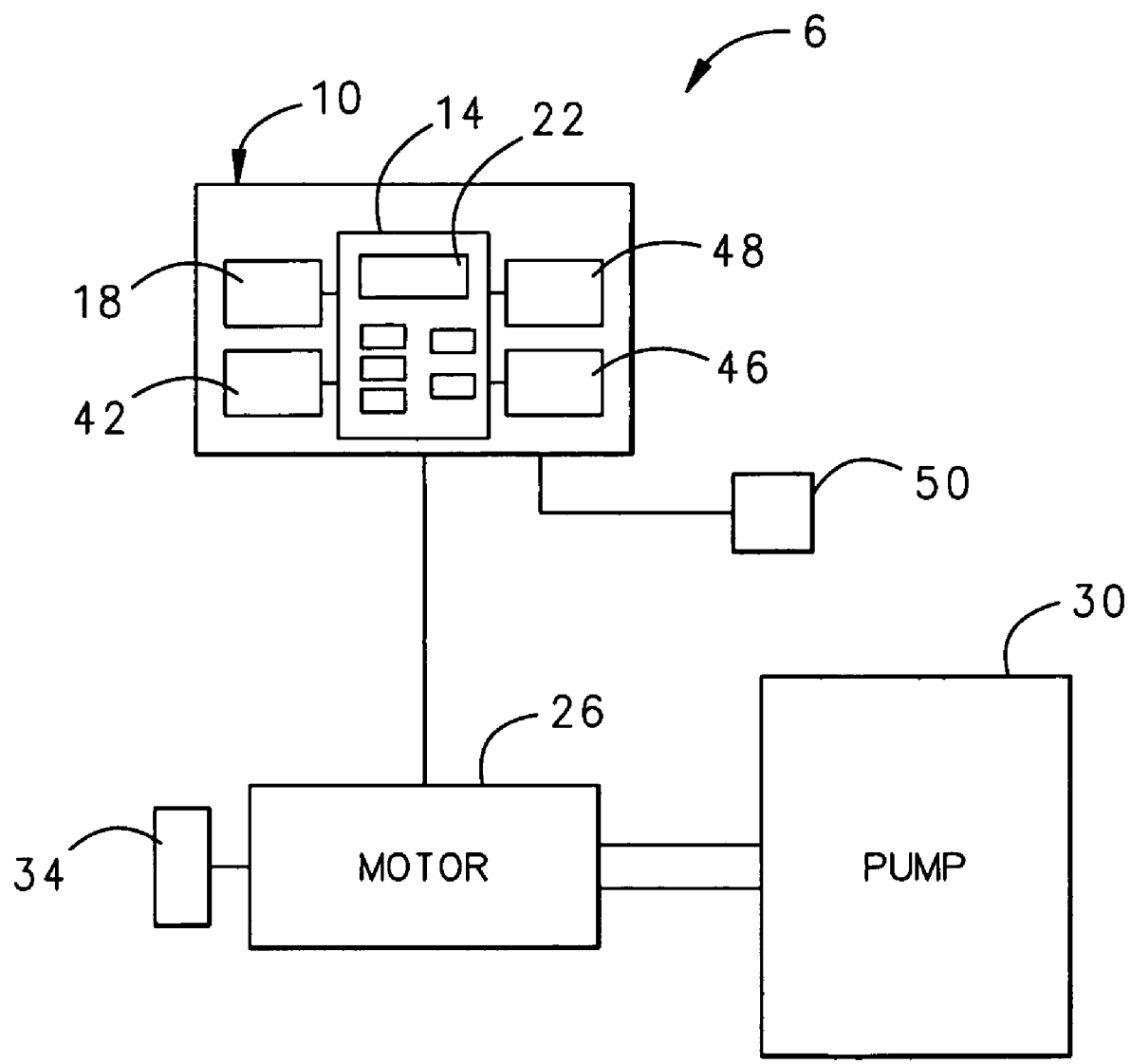
FIG. 1 is a schematic view of a machine assembly.

FIG. 1 shows a machine assembly 6 including a motor controller 10 that automatically determines a motor input power setting. The motor controller 10 includes an interface 14 for manually entering values of a motor output and an input power setting determining module 18 that automatically determines a motor input power setting based upon entered motor output values. A display portion 22 provides a visual display of the determined motor input power.

The motor controller 10 is used with a motor 26. In one example, the motor 26 is a three phase AC induction motor, however, this invention is not limited to a particular motor type. The motor 26 drives a device 30 in a known manner. In one example, the device 30 is an industrial pump that operates responsive to motion of the motor 26. In one example, if motor output exceeds a predetermined upper threshold, the pump 30 may burn out. If the motor 26 output fails to reach a predetermined lower threshold, the pump may not function adequately. The motor controller 10 is programmed to ensure proper motor operation.

The motor 26 has associated values of motor output power, including a motor rating and motor efficiency. Such values depend on a given motor design, as known. In some situations an external current transformer 34 may be used and an associated value of the transformer would be known.

The input power setting determining module 18 uses the motor output values to automatically determine a motor input power setting. In one example, an individual user manually determines the motor rating and motor efficiency in a known manner, such as consulting a printed manual or on a label on the motor 26. The user manually enters the motor output values into the controller 10, using the interface 14. The input power setting determining module 18 receives the motor output values and automatically determines the motor input power setting.

In one example, the input power setting determining module 18 utilizes the following equation to calculate the motor input power setting:

$$MIP = (MOP/ME) \times 0.746$$

where MIP is the motor input power setting in kW, MOP is the motor output power in Hp, and ME is the motor efficiency percentage. The determined motor input power setting is displayed on the display portion 22 for the user. The user then uses the determined motor input power setting to set the controller 10 for controlling the actual motor performance as appropriate. In one example, the controller 10 automatically uses the determined input power setting unless the user provides a different setting.

In another example, the motor controller 10 automatically determines motor input trip values. The illustrated example includes a trip input power determining module 42. The user enters a motor output trip value, which may be based on a percentage difference from a required motor output power, absolute Hp difference from a motor output power, or another selected value, for example. The trip input power determining module 42 in one example utilizes the following equation to determine a motor input trip value:

$$MITV = (MOTV/ME) \times 0.746$$

where MITV is the motor input trip value in kW, MOTV is the motor output trip value in Hp, and ME is the motor efficiency (in %). In this example, as the user manually enters the motor output trip value that represents a high trip value of the motor 26, the display portion 22 displays a high motor input trip value. When a user manually enters a motor output trip value that represents a low trip value of the motor 26, the display portion 22 displays a low motor input trip value.

The user can read the display portion 22 and then manually enter the automatically determined and displayed high and low motor input trip values into the controller 10 to set actual high and low motor input trip values for the motor 26. A trip module 46 receives the actual high and low motor input trip values and determines whether the actual input power to the motor 26 corresponds to the high or low motor input trip values. When the actual motor input power is outside of an acceptable range based on the high and low motor input trip values, the trip module 46 either interrupts the motor 26 input power or shuts off the motor 26.

Another feature of the example controller 10 is a lock module 48 that is useable to prevent changing the parameters set through the interface 14. In one example, by manipulating appropriate switches or buttons on the interface 14, a software-based lock function is implemented by the lock module 48, which maintains the settings provided by an individual. An appropriate manipulation of the interface 14 will allow the module to be unlocked by an authorized user, for example, to provide different settings.

Another feature of the example embodiment of FIG. 1 is a hardware lock 50 that includes circuitry that can be manipulated to lock the interface 14 so that current settings may not be changed. In one example, a mechanical switch can be manipulated to selectively lock the interface 14. In one example, the hardware lock 50 has such a switch and is positioned relative to the interface so that it is not readily available but requires some knowledge or technique to be accessed. Such a lock feature allows for an authorized individual to set the motor control parameters using the interface 14 and then have confidence that those parameters will not be changed inadvertently, for example.

Figure 2:
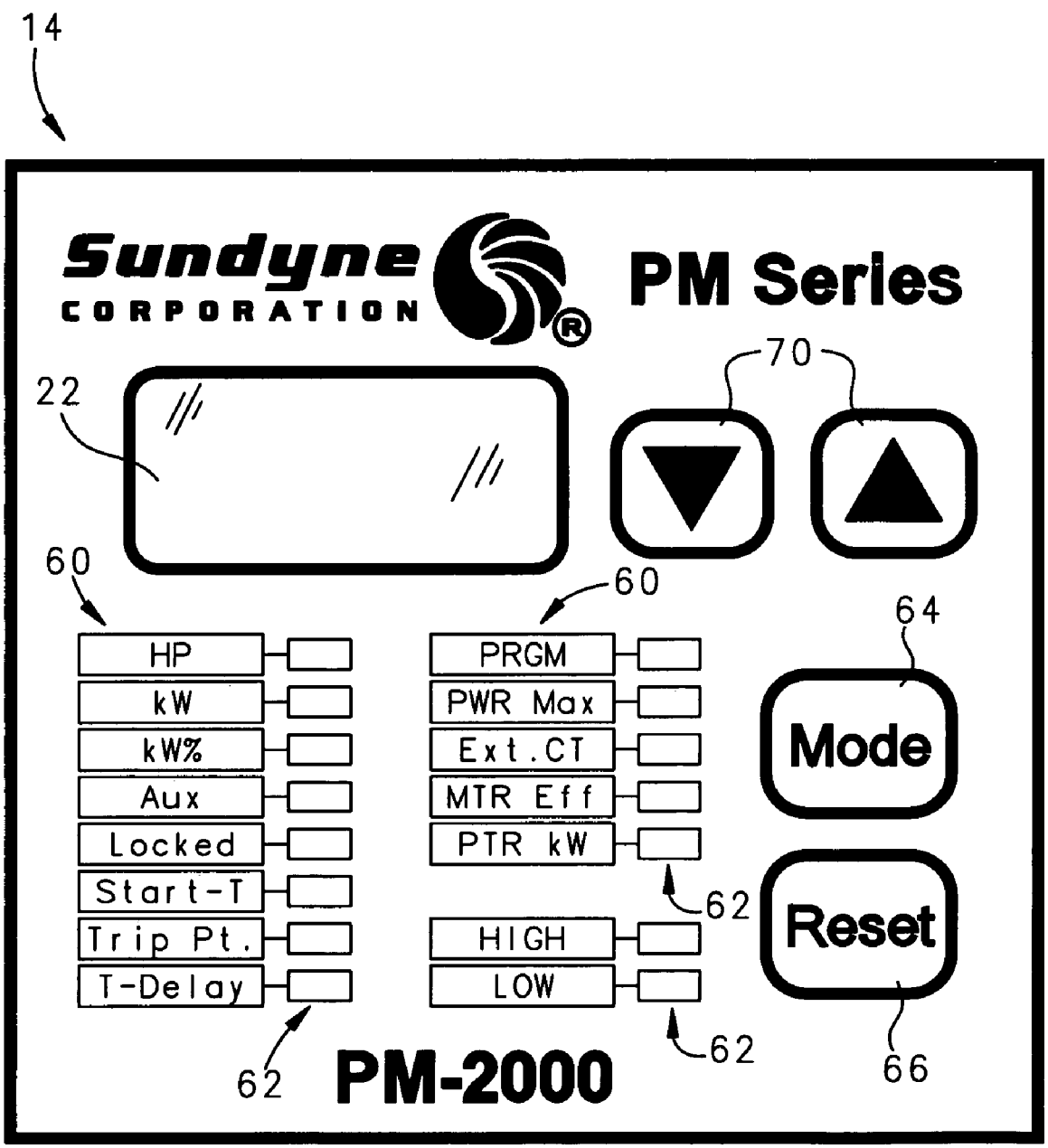
FIG. 2 schematically shows a motor controller interface.
Figure 3A:
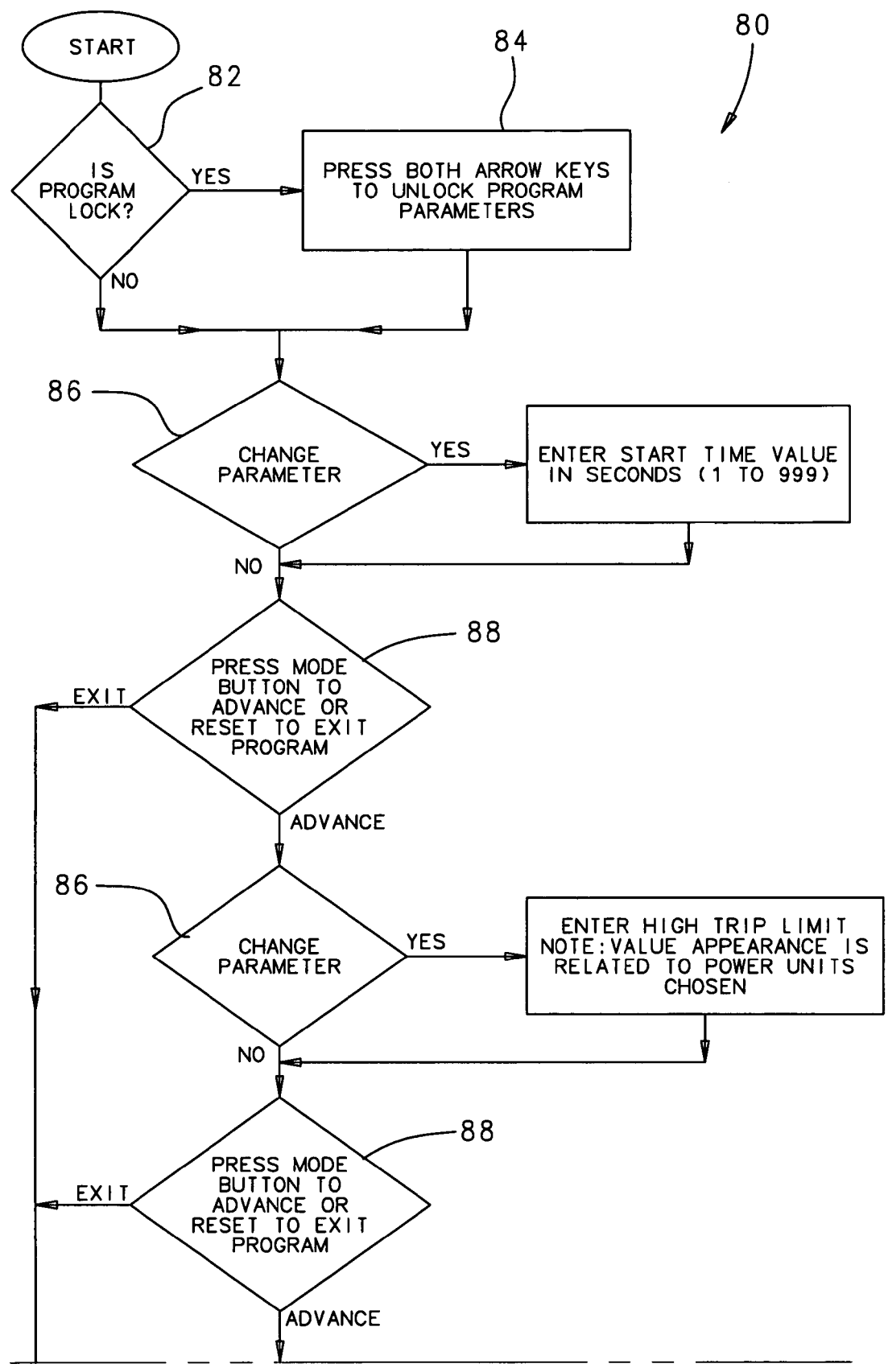
FIGS. 3a-3e show a flow chart diagram summarizing an example method of using a motor control interface.
Figure 3B:
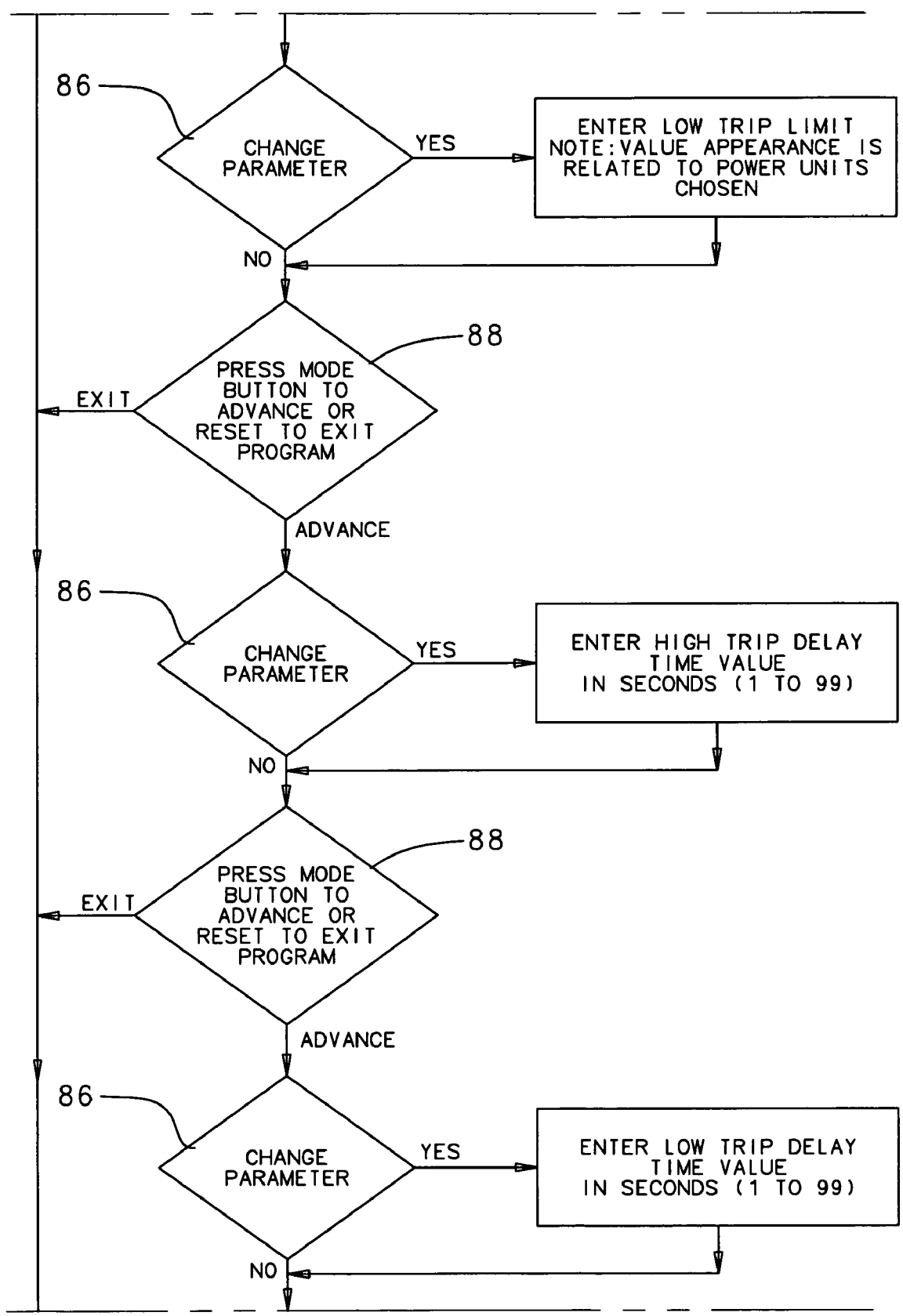
Figure 3C:
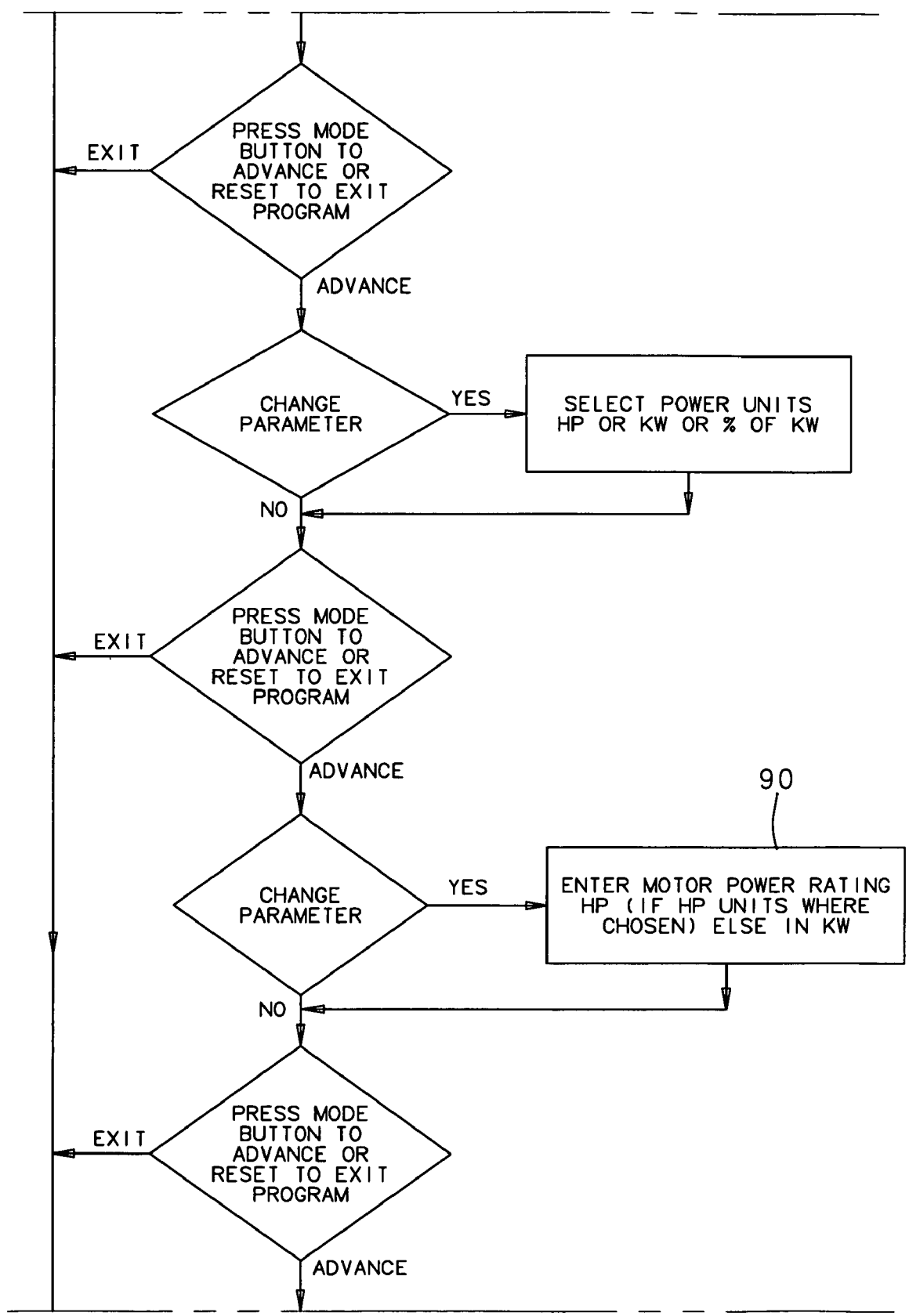
Figure 3D:
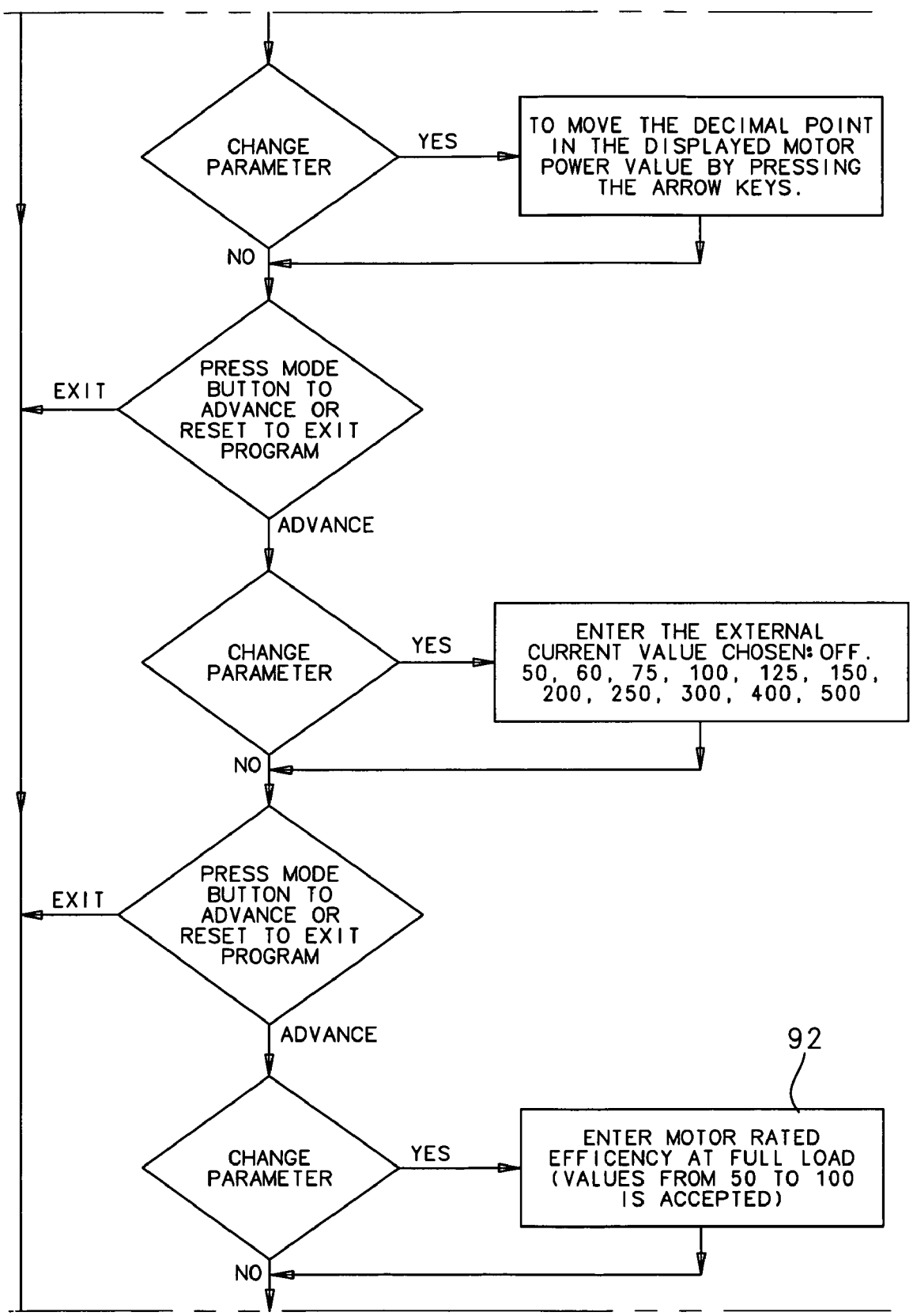
Figure 3E:
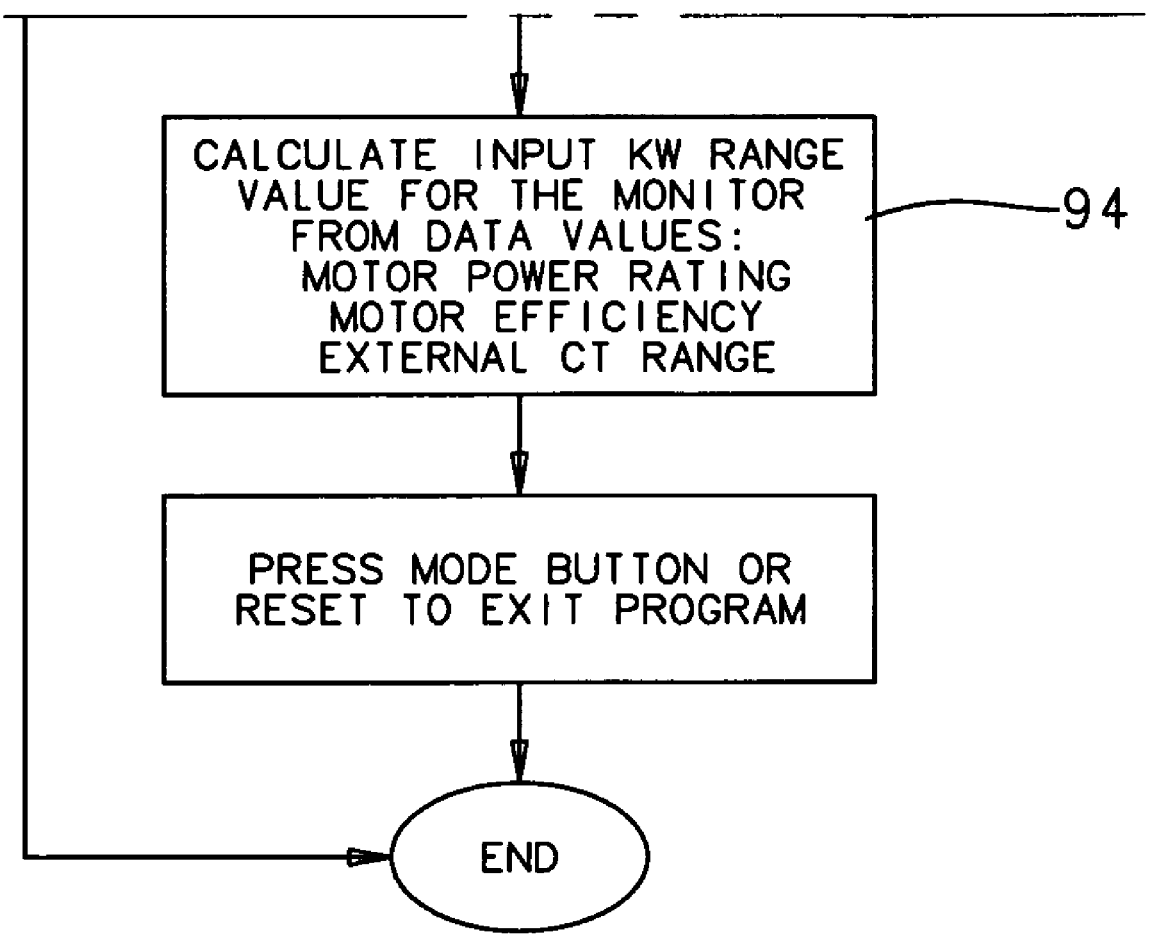

FIG. 2 schematically shows one example interface 14. In this example, the display portion 22 will provide information regarding one or more functions of the controller 10. In this example, a plurality of function selectors 60 can be selected for entering a corresponding value or changing the corresponding setting, for example. In the illustrated example, each function selector 60 has an associated light indicator 62 that lights up when that particular function is being displayed on the display portion 22. In one example, manually manipulating a switch (i.e., a push button or a touch screen) positioned at the visible location of a chosen function selector 60 allows a user to choose what will be displayed on the display portion 22. The corresponding light indicator 62 lights up to provide a visual indication of which function or information is being displayed on the display portion 22 at a given time. In the illustrated example, a mode button 64 can be manipulated to page through or toggle through the various functions corresponding to the function selector 60. In this example, a reset button 66 allows for exiting a particular function and allowing the controller 10 to resume or begin control of the motor 26, for example.

In the illustrated example, up and down arrow buttons 70 allow an individual to change the values shown in the display portion 22. This allows an individual to enter the desired motor input power setting, for example.

FIGS. 3a-3e show a flow chart diagram 80 that summarizes one example use of the interface 14 shown in FIG. 2. Assume for example that an individual approaches the interface 14 and intends to change one or more of the parameters set for controlling operation of the motor 26. At 82, the controller 10 begins by determining whether the lock module 48 or hardware lock 50 has been activated so that changes cannot be made. If so, at 84, the individual utilizes the arrow buttons 70 by pressing them both, simultaneously to unlock the lock module 48. In the event that the hardware lock 50 in the example of FIG. 1 has been set, the individual must first unlock the controller by manipulating the switch (not shown), for example.

As shown repeatedly at 86, the individual can use the up and down arrow buttons 70 to change a displayed parameter on the display portion 22. By utilizing the mode button 64, the individual can repeatedly page through the various functions corresponding to the function selectors 60.

For example, when the individual desires to set the motor input power setting, at 90 the individual enters the motor power rating information, for example when the light indicator 62 next to the function indicator HP (shown in FIG. 2) is lit. That provides the controller 10 with the motor output power rating in horsepower units. The mode button 64 allows the individual to page down from the HP indicator to the MTR Eff indicator. At 92, the individual can enter the motor rating efficiency when the function indicator MTR Eff light indicator 62 is lit indicating that the display portion 22 is showing the appropriate value. Once the motor power rating and motor efficiency output values have been entered, at 94, the controller 10 automatically determines the motor input power setting. In the example of FIG. 1, the input power setting determining module 18 determines the input power setting at 94. Then that determined setting is displayed on the display portion 22 when the light indicator 62 corresponding to the function indicator PTR kW is lit. By utilizing the mode switch 64 to get to the kilowatt range function indicator, the individual can make sure that the appropriate input power setting is established.

One example embodiment of a controller having an automated input power setting determining feature has been disclosed. It should be noted that the various modules or portions of the controller 10 are schematically illustrated for discussion purposes only. For example, one module in a controller embodying this invention may comprise hardware, software, firmware or a combination of these and some or part of that module's components may be utilized by another module from this description. Further, it must be noted that the controller 10 in the illustrated embodiment is described as having various functions including the actual motor control. In one example, the controller 10 is a power monitor that provides the setting features described above and monitors the input power to the motor 26. A separate controller (i.e., separate hardware or processor) provides the actual motor control functions responsive to information from the monitor. Those skilled in the art who have the benefit of this description will be able to select appropriate component combinations or arrangements to meet the needs of their particular situation.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A motor controller comprising:
an interface for manually entering values of a motor output;
an input power setting determining module that automatically determines a motor input power setting based upon entered motor output values; and a display portion that provides a visual display of the determined motor input power setting.

2. The motor controller as recited in claim 1, wherein said values of motor output comprise a motor rating value.

3. The motor controller as recited in claim 1, wherein said values of motor output comprise a motor efficiency value.

4. The motor controller as recited in claim 1, wherein said values of motor output comprise an external current transformer value.

5. The motor controller as recited in claim 1, including a trip module that automatically interrupts power to the motor responsive to an actual motor input power exceeding a motor input trip value that is based at least in part upon a motor output trip value.

6. The motor controller as recited in claim 5, wherein the controller automatically determines said motor input trip value based upon an entered motor output trip value.

7. The motor controller as recited in claim 1, wherein said interface selectively locks to prevent a user from changing a setting of the controller.

8. A machine assembly comprising:
   a motor having associated values of motor output;
   a device driven by said motor;
   an input power setting determining module that automatically determines a motor input power setting, using the associated motor output values; and
   a display portion that provides a visual display of the determined motor input power setting.

9. The machine assembly as recited in claim 8, wherein said values of motor output comprise a motor rating value.

10. The machine assembly as recited in claim 8, wherein said values of motor output comprise a motor efficiency value.

11. The machine assembly as recited in claim 8, wherein said device comprises a pump.

12. The machine assembly as recited in claim 8, including a trip module that automatically interrupts power to the motor responsive to an actual input power exceeding a motor input trip value that is based at least in part upon an entered motor output trip value.

13. The machine assembly as recited in claim 12, wherein the controller automatically determines said motor input trip value based upon an entered motor output trip value.

14. The machine assembly as recited in claim 8, including an interface for allowing a user to manually enter the associated values.

15. The machine assembly as recited in claim 14, wherein said interface selectively locks to prevent a user from changing a setting.

16. A method of determining a motor input power setting comprising the steps of:
   receiving values of a motor output including at least one of a motor rating value or a motor efficiency value; automatically determining a motor input power setting based upon the received values of motor output; and displaying the determined motor input power setting.

17. The method as recited in claim 16, comprising automatically determining an actual input power trip value responsive to a received motor output trip value and determining whether an actual input power corresponds to the trip value.

18. The motor controller of claim 1, wherein the interface is configured to allow a user to manually confirm use of the determined motor input power setting as displayed on the display portion.

19. The motor controller of claim 1, wherein the interface is configured to allow a user to manually change the input power setting from the determined motor input power setting displayed on the display portion.

20. The machine assembly of claim 8, comprising
   an interface configured to allow a user to manually confirm the determined motor input power setting displayed on the display portion.

21. The machine assembly of claim 8, comprising
   an interface configured to allow a user to manually change the determined motor input power setting displayed on the display portion.

22. A method of controlling a motor input power setting, comprising the steps of:
   manually entering a motor output value;
   observing a displayed motor input power setting that is automatically determined based upon the manually entered motor output value; and
   manually setting the motor input power setting responsive to observing the determined motor input power setting.

23. The method of claim 22, wherein the motor output value comprises at least one of a motor rating value or a motor efficiency value.

* * * * *

UNITED STATES PATENT AND TRADEMARK OFFICE
CERTIFICATE OF CORRECTION

PATENT NO. : 7,606,011 B2  Page 1 of 1
APPLICATION NO. : 10/825059
DATED : October 20, 2009
INVENTOR(S) : James Weldon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 768 days.

Signed and Sealed this

Fifth Day of October, 2010

David J. Kappos
*Director of the United States Patent and Trademark Office*